（12） United States Patent
Chen et al.

(10) Patent No.: US 11,303,387 B2
(45) Date of Patent: Apr. 12, 2022

(54) SIGNAL TRANSMISSION METHOD AND APPARATUS

(71) Applicant: HUAWEI TECHNOLOGIES CO., LTD., Guangdong (CN)

(72) Inventors: Lei Chen, Shenzhen (CN); Fengwei Liu, Chengdu (CN)

(73) Assignee: Huawei Technologies Co., Ltd., Guangdong (CN)

(*) Notice: Subject to any disclaimer, the term of this patent is extended or adjusted under 35 U.S.C. 154(b) by 344 days.

(21) Appl. No.: 16/668,934

(22) Filed: Oct. 30, 2019

(65) Prior Publication Data

US 2020/0067630 A1 Feb. 27, 2020

Related U.S. Application Data

(63) Continuation of application No. PCT/CN2018/087425, filed on May 18, 2018.

(30) Foreign Application Priority Data

May 18, 2017 (CN) .......................... 201710353504.5

(51) Int. Cl.
H04L 1/00 (2006.01)
H04L 5/00 (2006.01)
H04L 27/26 (2006.01)

(52) U.S. Cl.
CPC .......... *H04L 1/0025* (2013.01); *H04L 1/0003* (2013.01); *H04L 5/0007* (2013.01); *H04L 27/2636* (2013.01)

(58) Field of Classification Search
CPC ... H04L 1/0025; H04L 1/0003; H04L 5/0007; H04L 27/2636; H04L 1/0016; H04L 1/00;
(Continued)

(56) References Cited

U.S. PATENT DOCUMENTS

2011/0149792 A1 6/2011 Nakano et al.
2012/0087438 A1 4/2012 Futagi et al.
2015/0200746 A1 7/2015 Pan et al.
2018/0302906 A1* 10/2018 Baldemair ............ H04W 72/10
(Continued)

FOREIGN PATENT DOCUMENTS

CN 102204321 A 9/2011
CN 104468046 A 3/2015

OTHER PUBLICATIONS

Office Action issued in Indian Application No. 201917037306 dated Feb. 15, 2021, 6 pages.
(Continued)

Primary Examiner — Habte Mered
(74) Attorney, Agent, or Firm — Fish & Richardson P.C.

(57) ABSTRACT

The present disclosure relates to signal transmission methods and apparatus. One example method includes receiving, by a terminal device, modulation and coding scheme (MCS) information sent by a network device, determining a modulation order used by the terminal device for data transmission, where the modulation order is determined based on the MCS information sent by the network device, information about a waveform used by the terminal device, and a preset correspondence between an MCS index and a modulation order, and transmitting data based on the determined modulation order.

17 Claims, 3 Drawing Sheets

(58) Field of Classification Search
CPC ....... H04L 27/00; H04L 27/26; H04L 1/0009; H04L 27/0008; H04L 27/2601; H04L 27/2627
See application file for complete search history.

(56) References Cited

U.S. PATENT DOCUMENTS

2020/0136746 A1* 4/2020 Li .................. H04L 1/0003
2020/0162225 A1* 5/2020 Chen Larsson ..... H04L 27/2646
2021/0204257 A1* 7/2021 Xu ..................... H04W 72/042

OTHER PUBLICATIONS

Broadcom Corporation, "Details of MCS and TBS design for high order modulation," 3GPP TSG-RAN WG1 Meeting #76, R1-140608; Prague, Czech Republic, Feb. 10-14, 2014, 5 pages.

Ericsson, "On MCS/transport Block Size Determination for PUSCH," 3GPP TSG-RAN WG1 Meeting #89, R1-1709096, Hangzhou, China, May 15-19, 2017, 6 pages.

Ericsson, "Discussion on standard impacts to support 256QAM," 3GPP TSG RAN WG1 Meeting #74bis, R1-134657; Guangzhou, China, Oct. 7-11, 2013, 3 pages.

Extended European Search Report and Written Opinion issued in European Application No. 18801834.5 dated Feb. 12, 2020, 7 pages.

Ilth et al., "MCS Tables for pi/2 BPSK," 3GPP TSG RAN WG1 Meeting #88Bis, R1-1704781; Spokane, USA, Apr. 3-7, 2017, 1 page.

PCT International Search Report and Written Opinion issued in International Application No. PCT/CN2018/087425 dated Aug. 13, 2018, 13 pages (with English translation).

Samsung, "Modulation/waveform optimization for further PAPR reduction," 3GPP TSG RAN WG1 NR Ad-Hoc Meeting, R1-1700999; Spokane, USA, Jan. 16-20, 2017, 6 pages.

* cited by examiner

SIGNAL TRANSMISSION METHOD AND APPARATUS

CROSS-REFERENCE TO RELATED APPLICATIONS

This application is a continuation of International Application No. PCT/CN2018/087425, filed on May 18, 2018, which claims priority to Chinese Patent Application No. 201710353504.5, filed on May 18, 2017. The disclosures of the aforementioned applications are hereby incorporated by reference in their entireties.

TECHNICAL FIELD

The present invention relates to the field of wireless communications technologies, and in particular, to a signal transmission method and apparatus.

BACKGROUND

Orthogonal frequency division multiplexing (OFDM) and discrete fourier transform spread orthogonal frequency division multiplexing (DFT-S-OFDM) are two typical waveforms in wireless communication. The OFDM is a multi-carrier waveform and has advantages of a high anti-multipath capability and a flexible frequency division multiplexing manner, but has a disadvantage of an excessively high peak to average power ratio (PAPR). The DFT-S-OFDM introduces a DFT spread before inverse fast fourier transform (IFFT) of the OFDM, and provides a PAPR far lower than that in the OFDM while inheriting a plurality of advantages of the OFDM. Although the DFT-S-OFDM introduces a subcarrier processing process of the OFDM, the DFT-S-OFDM is essentially a single-carrier waveform.

Currently, in a new generation wireless communications standard, new radio (NR), of the 3rd Generation Partnership Project (3GPP), it is determined to use both the OFDM waveform and the DFT-S-OFDM waveform for an uplink. The OFDM waveform can provide a larger capacity in a high signal-to-noise ratio scenario and is suitable for cell center users, while the DFT-S-OFDM waveform features a low PAPR, can provide a higher output power for a power amplifier, therefore can provide wider coverage, and is suitable for cell edge users limited by coverage. In the NR, it is determined that UE needs to support both the OFDM waveform and DFT-s-OFDM waveform, and a network side determines a waveform used for each transmission. The DFT-s-OFDM is used only for single-stream transmission.

In long term evolution (LTE), a modulation and coding scheme (MCS) is used to represent a modulation order and a transport block size of an uplink data channel or a downlink data channel, and a coding bit rate can be determined based on a transport block size. Each downlink or uplink scheduling signaling carries an MCS configuration, so that a terminal device determines a modulation and coding scheme for this downlink or uplink data channel transmission.

However, in the LTE, the terminal device supports only the DFT-S-OFDM waveform during uplink transmission, similarly to a downlink, and supports 32 MCS indexes (index) from 0 to 31 in an uplink. However, in the NR, it is determined that the terminal device needs to support both the OFDM waveform and the DFT-s-OFDM waveform. If an MCS configuration method in the LTE is introduced to the NR, that is, a single MCS configuration is used to correspond to two uplink waveforms, the UE cannot separately use modulation and coding corresponding to the two uplink waveforms, or differences between the respective waveforms cannot be reflected.

SUMMARY

Embodiments of the present invention provide a signal transmission method and apparatus, to reflect a difference between an OFDM waveform and a DFT-s-OFDM waveform in new radio.

According to a first aspect, a signal transmission method is provided, and the method includes: receiving, by a terminal device, MCS information sent by a network device, then determining, based on the MCS information sent by the network device, information about a waveform used by the terminal device, and a preset correspondence between an MCS index and a modulation order, a modulation order used by the terminal device for data transmission, and transmitting data based on the determined modulation order.

The terminal device obtains, based on the MCS information sent by the network device, the information about the waveform used by the terminal device, the preset correspondence between an MCS index and a modulation order, the modulation order used by the terminal device for data transmission, to transmit data, so that a difference between different waveforms can be reflected, and modulation and coding schemes corresponding to different waveforms are obtained.

With reference to the first aspect, in a first possible implementation of the first aspect, the determining a modulation order used by the terminal device for data transmission further includes: determining, by the terminal device based on the MCS information sent by the network device, the information about the waveform used by the terminal device, the preset correspondence between an MCS index and a modulation order, and information about an MCS supported by the terminal device, the modulation order used by the terminal device for data transmission.

The information about the MCS supported by the terminal device is further considered, while the modulation order used by the terminal device for data transmission is determined. A range of the determined MCS index supported by the terminal device is further limited, thereby improving efficiency of determining the modulation order used by the terminal device for data transmission.

With reference to the first aspect or the first possible implementation of the first aspect, in a second possible implementation of the first aspect, the determining a modulation order used by the terminal device for data transmission includes: determining, by the terminal device, MCS offset information based on the information about the waveform used by the terminal device and the information about the MCS supported by the terminal device, and determining, based on the MCS offset information, the MCS information sent by the network device, and the preset correspondence between an MCS index and a modulation order, the modulation order used by the terminal device for data transmission.

By using the MCS offset information obtained by using the information about the waveform used by the terminal device and the MCS information supported by the terminal device, MCS indexes corresponding to different waveforms can be distinguished based on the preset correspondence between an MCS index and a modulation order, so that modulation and coding schemes corresponding to different waveforms can be obtained.

With reference to the first aspect or the first possible implementation of the first aspect, in a third possible implementation of the first aspect, the determining a modulation order used by the terminal device for data transmission includes: determining, by the terminal device based on the information about the waveform used by the terminal device and the information about the MCS supported by the terminal device, a mapping relationship between the MCS information sent by the network device and an MCS index, and determining, based on the determined mapping relationship between the MCS information sent by the network device and an MCS index, the MCS information sent by the network device, and the preset correspondence between an MCS index and a modulation order, the modulation order used by the terminal device for data transmission.

The mapping relationship between the MCS information sent by the network device and an MCS index is obtained based on the information about the waveform used by the terminal device and the information about the MCS supported by the terminal device, and MCS indexes corresponding to different waveforms can be distinguished based on the preset correspondence between an MCS index and a modulation order, so that modulation and coding schemes corresponding to different waveforms can be obtained.

With reference to the first aspect or the first possible implementation of the first aspect, in a fourth possible implementation of the first aspect, the determining a modulation order used by the terminal device for data transmission includes: determining, by the terminal device based on the information about the waveform used by the terminal device, a correspondence between an MCS index corresponding to the waveform used by the terminal device and a modulation order, and determining, based on the MCS information sent by the network device, the information about the MCS supported by the terminal device, and the determined correspondence between an MCS index corresponding to the waveform used by the terminal device and a modulation order, the modulation order used by the terminal device for data transmission.

The preset correspondence between an MCS index corresponding to the information about the waveform used by the terminal device and a modulation order may be obtained based on the information about the waveform used by the terminal device, and each waveform corresponds to a preset correspondence between an MCS index and a modulation order. Then, the modulation order used by the terminal device for data transmission may be quickly obtained based on the MCS information sent by the network device, to obtain a corresponding modulation and coding scheme.

With reference to the first aspect, in a fifth possible implementation of the first aspect, the determining a modulation order used by the terminal device for data transmission includes: determining, by the terminal device, MCS offset information based on the information about the waveform used by the terminal device, and determining, based on the MCS offset information, the MCS information sent by the network device, and the preset correspondence between an MCS index and a modulation order, the modulation order used by the terminal device for data transmission.

By using the MCS offset information obtained based on the information about the waveform used by the terminal device, MCS indexes corresponding to different waveforms can be distinguished based on the preset correspondence between an MCS index and a modulation order, so that modulation and coding schemes corresponding to different waveforms can be obtained.

With reference to the first aspect, in a sixth possible implementation of the first aspect, the determining a modulation order used by the terminal device for data transmission includes: determining, by the terminal device based on the information about the waveform used by the terminal device, a mapping relationship between the MCS information sent by the network device and an MCS index, and determining, based on the determined mapping relationship between the MCS information sent by the network device and an MCS index, the MCS information sent by the network device, and the preset correspondence between an MCS index and a modulation order, the modulation order used by the terminal device for data transmission.

The mapping relationship between the MCS information sent by the network device and an MCS index is obtained based on the information about the waveform used by the terminal device, and MCS indexes corresponding to different waveforms can be distinguished based on the preset correspondence between an MCS index and a modulation order, so that modulation and coding schemes corresponding to different waveforms can be obtained.

With reference to the first aspect, in a seventh possible implementation of the first aspect, the determining a modulation order used by the terminal device for data transmission includes: determining, by the terminal device based on the information about the waveform used by the terminal device, a correspondence between an MCS index corresponding to the waveform used by the terminal device and a modulation order, and determining, based on the MCS information sent by the network device and the determined correspondence between an MCS index corresponding to the waveform used by the terminal device and a modulation order, the modulation order used by the terminal device for data transmission.

The preset correspondence between an MCS index corresponding to the information about the waveform used by the terminal device and a modulation order may be obtained based on the information about the waveform used by the terminal device, and each waveform corresponds to a preset correspondence between an MCS index and a modulation order. Then, the modulation order used by the terminal device for data transmission may be quickly obtained based on the MCS information sent by the network device, to obtain a corresponding modulation and coding scheme.

According to a second aspect, a signal transmission method is provided, and the method includes:
determining, by a network device, MCS information of a terminal device, where the MCS information is used to indicate a modulation order used by the terminal device for data transmission, and the modulation order of the terminal device is determined based on the MCS information of the terminal device, information about a waveform used by the terminal device, and a preset correspondence between an MCS index and a modulation order; and sending, by the network device, the determined MCS information.

With reference to the second aspect, in a first possible implementation of the second aspect, the modulation order of the terminal device is determined based on the MCS information of the terminal device, MCS offset information, and the preset correspondence between an MCS index and a modulation order, and the MCS offset information is determined based on the information about the waveform used by the terminal device.

With reference to the second aspect, in a second possible implementation of the second aspect, the modulation order of the terminal device is determined based on the MCS information of the terminal device, a mapping relationship between the MCS information of the terminal device and an MCS index, and the preset correspondence between an MCS index and a modulation order, and the mapping relationship between the MCS information of the terminal device and an MCS index is determined based on the information about the waveform used by the terminal device.

With reference to the second aspect, in a third possible implementation of the second aspect, the modulation order of the terminal device is determined based on the MCS information of the terminal device, a correspondence between an MCS index corresponding to the waveform used by the terminal device and a modulation order, and the preset correspondence between an MCS index and a modulation order, and the correspondence between an MCS index corresponding of the waveform used by the terminal device and a modulation order is determined based on the information about the waveform used by the terminal device.

According to a third aspect, a signal transmission apparatus is provided, including:

a transceiver unit, configured to receive MCS information sent by a network device; a processing unit, configured to determine, based on the MCS information sent by the network device, information about a waveform used by a terminal device, and a preset correspondence between an MCS index and a modulation order, a modulation order used by the terminal device for data transmission, and transmit data based on the determined modulation order.

With reference to the third aspect, in a first possible implementation of the third aspect, when determining the modulation order used by the terminal device for data transmission, the processing unit is further configured to determine, based on the MCS information sent by the network device, the information about the waveform used by the terminal device, the preset correspondence between an MCS index and a modulation order, and information about an MCS supported by the terminal device, the modulation order used by the terminal device for data transmission.

With reference to the third aspect or the first possible implementation of the third aspect, in a second possible implementation of the third aspect, when determining the modulation order used by the terminal device for data transmission, the processing unit is specifically configured to determine MCS offset information based on the information about the waveform used by the terminal device and the information about the MCS supported by the terminal device, and determine, based on the MCS offset information, the MCS information sent by the network device, and the preset correspondence between an MCS index and a modulation order, the modulation order used by the terminal device for data transmission.

With reference to the third aspect or the first possible implementation of the third aspect, in a third possible implementation of the third aspect, when determining the modulation order used by the terminal device for data transmission, the processing unit is specifically configured to determine, based on the information about the waveform used by the terminal device and the information about the MCS supported by the terminal device, a mapping relationship between the MCS information sent by the network device and an MCS index, and determine, based on the determined mapping relationship between the MCS information sent by the network device and an MCS index, the MCS information sent by the network device, and the preset correspondence between an MCS index and a modulation order, the modulation order used by the terminal device for data transmission.

With reference to the third aspect or the first possible implementation of the third aspect, in a fourth possible implementation of the third aspect, when determining the modulation order used by the terminal device for data transmission, the processing unit is specifically configured to determine, based on the information about the waveform used by the terminal device, a correspondence between an MCS index corresponding to the waveform used by the terminal device and a modulation order, and determine, based on the MCS information sent by the network device, the information about the MCS supported by the terminal device, and the determined correspondence between an MCS index corresponding to the waveform used by the terminal device and a modulation order, the modulation order used by the terminal device for data transmission.

With reference to the third aspect, in a fifth possible implementation of the third aspect, when determining the modulation order used by the terminal device for data transmission, the processing unit is specifically configured to determine MCS offset information based on the information about the waveform used by the terminal device, and determine, based on the MCS offset information, the MCS information sent by the network device, and the preset correspondence between an MCS index and a modulation order, the modulation order used by the terminal device for data transmission.

With reference to the third aspect, in a sixth possible implementation of the third aspect, when determining the modulation order used by the terminal device for data transmission, the processing unit is specifically configured to determine, based on the information about the waveform used by the terminal device, a mapping relationship between the MCS information sent by the network device and an MCS index, and determine, based on the determined mapping relationship between the MCS information sent by the network device and an MCS index, the MCS information sent by the network device, and the preset correspondence between an MCS index and a modulation order, the modulation order used by the terminal device for data transmission.

With reference to the third aspect, in a seventh possible implementation of the third aspect, when determining the modulation order used by the terminal device for data transmission, the processing unit is specifically configured to determine, based on the information about the waveform used by the terminal device, a correspondence between an MCS index corresponding to the waveform used by the terminal device and a modulation order, and determine, based on the MCS information sent by the network device and the determined correspondence between an MCS index corresponding to the waveform used by the terminal device and a modulation order, the modulation order used by the terminal device for data transmission.

According to a fourth aspect, a signal transmission apparatus is provided, including:

a processing unit, configured to determine MCS information of a terminal device, where the MCS information is used to indicate a modulation order used by the terminal device for data transmission, and the modulation order of the terminal device is determined based on the MCS information of the terminal device, information about a waveform used by the terminal device, and a preset correspondence between an MCS index and a modulation order; and a transceiver unit, configured to send the determined MCS information.

With reference to the fourth aspect, in a first possible implementation of the fourth aspect, the modulation order of the terminal device is determined based on the MCS information of the terminal device, MCS offset information, and the preset correspondence between an MCS index and a modulation order, and the MCS offset information is determined based on the information about the waveform used by the terminal device.

With reference to the fourth aspect, in a second possible implementation of the fourth aspect, the modulation order of the terminal device is determined based on the MCS information of the terminal device, a mapping relationship between the MCS information of the terminal device and an MCS index, and the preset correspondence between an MCS index and a modulation order, and the mapping relationship between the MCS information of the terminal device and an MCS index is determined based on the information about the waveform used by the terminal device.

With reference to the fourth aspect, in a third possible implementation of the fourth aspect, the modulation order of the terminal device is determined based on the MCS information of the terminal device, a correspondence between an MCS index corresponding to the waveform used by the terminal device and a modulation order, and the preset correspondence between an MCS index and a modulation order, and the correspondence between an MCS index corresponding of the waveform used by the terminal device and a modulation order is determined based on the information about the waveform used by the terminal device.

According to a fifth aspect, a signal transmission device is provided, including a transceiver and a processor. The transceiver and processor are configured to perform the method provided in the first aspect or any implementation of the first aspect.

According to a sixth aspect, a signal transmission device is provided, including a transceiver and a processor. The transceiver and processor are configured to perform the method provided in the second aspect or any implementation of the second aspect.

According to a seventh aspect, a computer storage medium is provided, and is configured to store a computer software instruction executed by the processor provided in the fifth aspect, to perform the method according to the first aspect or the possible implementation of the first aspect.

According to an eighth aspect, a computer storage medium is provided, and is configured to store a computer software instruction executed by the processor provided in the sixth aspect, to perform the method according to the second aspect or the possible implementation of the second aspect.

DESCRIPTION OF EMBODIMENTS

Figure 1:
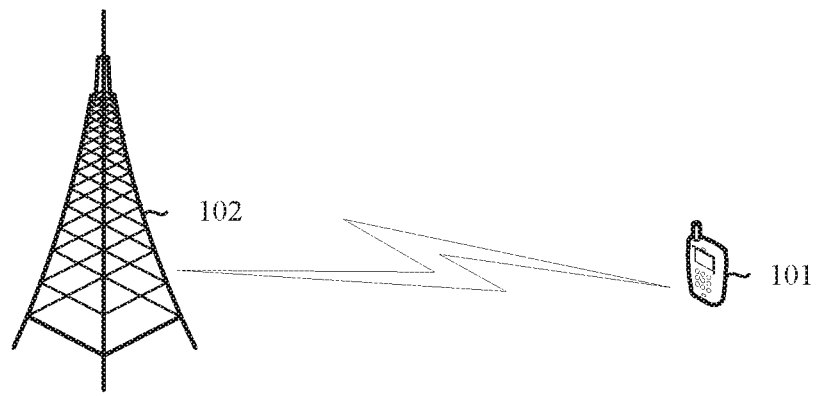
FIG. 1 is a schematic diagram of a system architecture according to an embodiment of the present invention.

FIG. 1 shows an example of a system architecture to which the embodiments of the present invention are applicable. Control of a signal transmission method can be implemented based on the system architecture. The system architecture of the signal transmission method provided in the embodiments of the present invention includes a terminal device 101 and a network device 102. The network device 102 is a service network side device of the terminal device 101, and the service network side device provides various services for the terminal device 101 by using a wireless air interface protocol. The network device 102 and the terminal device 101 may communicate by using an air interface protocol.

The network side device in the embodiments of the present invention may be a base transceiver station (BTS) in a global system for mobile communications (GSM) or code division multiple access (CDMA), may be a NodeB (NB) in wideband code division multiple access (WCDMA), or may be an evolved NodeB (eNB or eNodeB) in long term evolution (LTE), a relay station or an access point, a gNB (gNB or gNodeB) in a future 5G network, or the like. This is not limited in the embodiments of the present invention.

The terminal device in the embodiments of the present invention may be a wireless terminal device, or may be a wired terminal device. The wireless terminal device may be a device that provides voice and/or other service data connectivity for a user, a handheld device with a wireless connection function, or another processing device connected to a wireless modem. The wireless terminal device may communicate with one or more core networks through a radio access network (RAN). The wireless terminal device may be a mobile terminal, such as a mobile phone (or referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless terminal device may be a device such as a personal communications service (PCS) phone, a cordless telephone set, a session initiation protocol (SIP) phone, a wireless local loop (WLL) station, or a personal digital assistant (PDA). The wireless terminal device may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), a user device (User Device or User Equipment).

Some English abbreviations in the embodiments of the present invention are described by using an LTE system as an example in the embodiments of the present invention, and may change as networks evolve. For specific evolution, refer to descriptions of corresponding standards.

Figure 2:
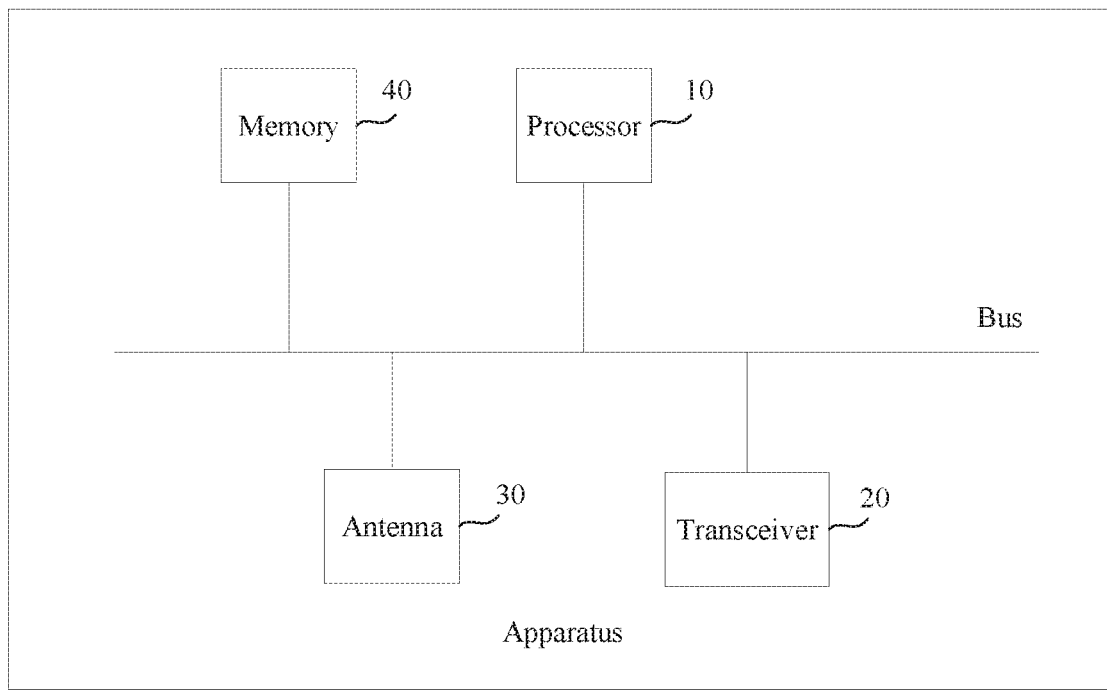
FIG. 2 is a schematic structural diagram of a signal transmission apparatus according to an embodiment of the present invention.

Next, FIG. 2 is a possible structural diagram of an apparatus according to an embodiment of the present invention. The apparatus may be a possible structural diagram of the terminal device 101 and a network side device. As shown in FIG. 2, the apparatus includes a processor 10, a transceiver 20, an antenna 30, and a memory 40. The memory 40, the transceiver 20, and the processor 10 may be connected by using a bus. Certainly, during actual application, the memory 40, the transceiver 20, and the processor 10 may not be of a bus structure, but may be of another structure such as a star-shaped structure. This is not specifically limited in this embodiment of the present invention.

Optionally, the processor 10 may be specifically a general-purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 10 may include at least one processing core.

Optionally, the memory 40 may include one or more of a read-only memory (ROM), a random access memory (RAM), and a magnetic disk memory. The memory 40 is configured to store data and/or an instruction that are/is required when the processor 10 runs. There may be one or more memories 40.

Optionally, the transceiver 20 may be physically separated, and divided into a receiver and a transmitter, or may be integrated. The transceiver 20 may send data by using the antenna 30.

Figure 3:
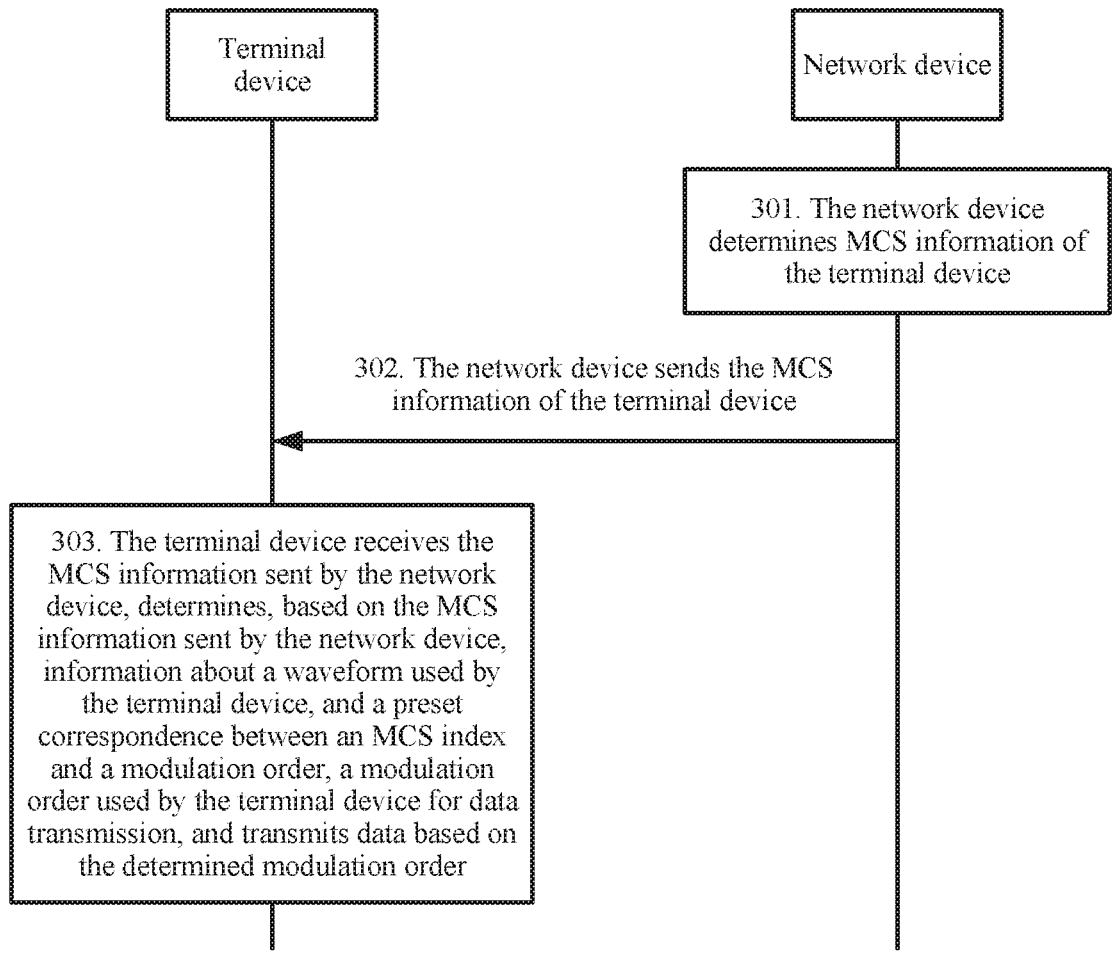
FIG. 3 is a schematic flowchart of a signal transmission method according to an embodiment of the present invention.

Next, FIG. 3 shows an example of a process of a signal transmission method according to an embodiment of the present invention.

As shown in FIG. 3, the process specifically includes the following steps:

Step 301: A network device determines MCS information of a terminal device.

Step 302: The network device sends the MCS information of the terminal device.

Step 303: The terminal device receives the MCS information sent by the network device, determines, based on the MCS information sent by the network device, information about a waveform used by the terminal device, and a preset correspondence between an MCS index and a modulation order, a modulation order used by the terminal device for data transmission, and transmits data based on the determined modulation order.

In this embodiment of the present invention, the network device and the terminal device each store the preset correspondence between an MCS index and a modulation order. The correspondence may be stored in a form of a table, or may be stored in another form. This is not limited in this embodiment of the present invention. For the preset correspondence between an MCS index and a modulation order, a plurality of waveforms may correspondingly use a same preset correspondence between an MCS index and a modulation order, or each waveform may use a preset correspondence between an MCS index and a modulation order of the waveform.

For example, the preset correspondence between an MCS index and a modulation order is represented as a table. When a DFT-s-OFDM waveform and an OFDM waveform share a same table, the table may be shown in Table 1.

TABLE 1

| MCS index $I^{MCS}$ | Modulation order $Q_m$ |
|---|---|
| 0 | 1 |
| 1 | 1 |
| ... | ... |

TABLE 1-continued

| MCS index $I^{MCS}$ | Modulation order $Q_m$ |
|---|---|
| $N_1$ | 1 |
| $N_1 + 1$ | 2 |
| ... | ... |
| $N_2$ | 2 |
| $N_2 + 1$ | 4 |
| ... | ... |
| $N_3$ | 4 |
| $N_3 + 1$ | 6 |
| ... | ... |
| $N_4$ | 6 |
| $N_4 + 1$ | 8 |
| ... | ... |
| $N_5$ | 8 |

As shown in Table 1, in this example, the MCS indexes 0 to $N_1$ correspond to the modulation order 1, and may correspond to a modulation and coding scheme: binary phase shift keying (BPSK) or pi/2 BPSK modulation. The MCS indexes $N_1+1$ to $N_2$ correspond to the modulation order 2, and may correspond to a modulation and coding scheme: quadrature phase shift keying (QPSK) modulation. The MCS indexes $N_2+1$ to $N_3$ correspond to the modulation order 4, and may correspond to a modulation and coding scheme: 16 quadrature amplitude modulation (QAM) modulation. The MCS indexes $N_3+1$ to $N_4$ correspond to the modulation order 6, and may correspond to a modulation and coding scheme: 64QAM modulation. The MCS indexes $N_4+1$ to $N_5$ correspond to the modulation order 8, and may correspond to a modulation and coding scheme: 256QAM modulation. $N_1$, $N_2$, $N_3$, $N_4$, and $N_5$ are positive integers, and $N_1<N_2<N_3<N_4<N_5$.

Optionally, when the DFT-s-OFDM waveform and the OFDM waveform use different tables, for example, when modulation and coding schemes supported by the DFT-s-OFDM waveform are BPSK, QPSK, and 16QAM, a used table may be shown in Table 2. When modulation and coding schemes supported by the DFT-s-OFDM waveform are BPSK, QPSK, 16QAM, and 64QAM, a used table may be shown in Table 3. When modulation and coding schemes supported by the OFDM waveform are QPSK, 16QAM, and 64QAM, a used table may be shown in Table 4. When modulation and coding schemes supported by the OFDM waveform are QPSK, 16QAM, 64QAM, and 256QAM, a used table may be shown in Table 5.

TABLE 2

| MCS index $I^{MCS}$ | Modulation order $Q_m$ |
|---|---|
| 0 | 1 |
| 1 | 1 |
| ... | ... |
| $N_1$ | 1 |
| $N_1 + 1$ | 2 |
| ... | ... |
| $N_2$ | 2 |
| $N_2 + 1$ | 4 |
| ... | ... |
| $N_3$ | 4 |

As shown in Table 2, in this example, the MCS indexes 0 to $N_1$ correspond to the modulation order 1, and may correspond to a modulation and coding scheme: binary phase shift keying (BPSK) or pi/2 BPSK modulation. The MCS indexes $N_1+1$ to $N_2$ correspond to the modulation order 2, and may correspond to a modulation and coding scheme: QPSK modulation. The MCS indexes $N_2+1$ to $N_3$ correspond to the modulation order 4, and may correspond to a modulation and coding scheme: 16QAM modulation. $N_1$, $N_2$, and $N_3$ are positive integers, and $N_1<N_2<N_3$.

TABLE 3

| MCS index$^{IMCS}$ | Modulation order $Q_m$ |
|---|---|
| 0 | 1 |
| 1 | 1 |
| ... | ... |
| $N_1$ | 1 |
| $N_1 + 1$ | 2 |
| ... | ... |
| $N_2$ | 2 |
| $N_2 + 1$ | 4 |
| ... | ... |
| $N_3$ | 4 |
| $N_3 + 1$ | 6 |
| ... | ... |
| $N_4$ | 6 |

As shown in Table 3, in this example, the MCS indexes 0 to $N_1$ correspond to the modulation order 1, and may correspond to a modulation and coding scheme: binary phase shift keying (BPSK) or pi/2 BPSK modulation. The MCS indexes $N_1+1$ to $N_2$ correspond to the modulation order 2, and may correspond to a modulation and coding scheme: QPSK modulation. The MCS indexes $N_2+1$ to $N_3$ correspond to the modulation order 4, and may correspond to a modulation and coding scheme: 16QAM modulation. The MCS indexes $N_3+1$ to $N_4$ correspond to the modulation order 6, and may correspond to a modulation and coding scheme: 64QAM modulation. $N_1$, $N_2$, $N_3$, and $N_4$ are positive integers, and $N_1<N_2<N_3<N_4$.

TABLE 4

| MCS index$^{IMCS}$ | Modulation order $Q_m$ |
|---|---|
| 0 | 1 |
| 1 | 1 |
| ... | ... |
| $N_4$ | 1 |
| $N_4 + 1$ | 4 |
| ... | ... |
| $N_5$ | 4 |
| $N_5 + 1$ | 6 |
| ... | ... |
| $N_6$ | 6 |

As shown in Table 4, in this example, the MCS indexes 0 to $N_4$ correspond to the modulation order 2, and may correspond to a modulation and coding scheme: QPSK modulation. The MCS indexes $N_4+1$ to $N_5$ correspond to the modulation order 4, and may correspond to a modulation and coding scheme: 16QAM modulation. The MCS indexes $N_5+1$ to $N_6$ correspond to the modulation order 6, and may correspond to a modulation and coding scheme: 64QAM modulation. $N_4$, $N_5$, and $N_6$ are positive integers, and $N_4<N_5<N_6$.

TABLE 5

| MCS index$^{IMCS}$ | Modulation order $Q_m$ |
|---|---|
| 0 | 2 |
| 1 | 2 |
| ... | ... |
| $N_5$ | 2 |
| $N_5 + 1$ | 4 |
| ... | ... |
| $N_6$ | 4 |
| $N_6 + 1$ | 6 |
| ... | ... |

TABLE 5-continued

| MCS index$^{IMCS}$ | Modulation order $Q_m$ |
|---|---|
| $N_7$ | 6 |
| $N_7 + 1$ | 8 |
| ... | ... |
| $N_8$ | 8 |

As shown in Table 5, in this example, the MCS indexes 0 to $N_5$ correspond to the modulation order 2, and may correspond to a modulation and coding scheme: QPSK modulation. The MCS indexes $N_5+1$ to $N_6$ correspond to the modulation order 4, and may correspond to a modulation and coding scheme: 16QAM modulation. The MCS indexes $N_6+1$ to $N_7$ correspond to the modulation order 6, and may correspond to a modulation and coding scheme: 64QAM modulation. The MCS indexes $N_7+1$ to $N_8$ correspond to the modulation order 8, and may correspond to a modulation and coding scheme: 256QAM modulation. $N_5$, $N_6$, $N_7$, and $N_8$ are positive integers, and $N_5<N_6<N_7<N_8$.

It should be noted that content represented in the tables is only an example, and represents possible subsets of MCS indexes and modulation orders. If other solutions include all or a part of the tables, it may also be considered that the other solutions shall fall within the protection scope of this embodiment of the present invention.

Optionally, the network device and the terminal device may further store a preset correspondence between an MCS index and a transport block size, or a preset correspondence between an MCS index and a redundancy version, or a preset correspondence between an MCS index and one of a modulation order, a transport block size, and a redundancy version.

When the DFT-s-OFDM waveform and the OFDM waveform share a same table, the preset correspondence between an MCS index and one of a modulation order, a transport block size, and a redundancy version may be shown in Table 6. The preset correspondence between an MCS index and a transport block size and the preset correspondence between an MCS index and a redundancy version may be obtained by splitting Table 6 in a form of Table 1. This is not described in this embodiment of the present invention.

When the DFT-s-OFDM waveform and the OFDM waveform each use a table, when modulation and coding schemes supported by the DFT-s-OFDM waveform are BPSK, QPSK, and 16QAM, the preset correspondence between an MCS index and one of a modulation order, a transport block size, and a redundancy version may be shown in Table 7. The preset correspondence between an MCS index and a transport block size and the preset correspondence between an MCS index and a redundancy version may be obtained by splitting Table 7 in a form of Table 2. This is not described in this embodiment of the present invention. When modulation and coding schemes supported by the DFT-s-OFDM waveform are BPSK, QPSK, 16QAM, and 64QAM, the preset correspondence between an MCS index and one of a modulation order, a transport block size, and a redundancy version may be shown in Table 8. The preset correspondence between an MCS index and a transport block size and the preset correspondence between an MCS index and a redundancy version may be obtained by splitting Table 8 in a form of Table 3. This is not described in this embodiment of the present invention.

When modulation and coding schemes supported by the OFDM waveform are QPSK, 16QAM, and 64QAM, the preset correspondence between an MCS index and one of a modulation order, a transport block size, and a redundancy version may be shown in Table 9. The preset correspondence between an MCS index and a transport block size and the preset correspondence between an MCS index and a redundancy version may be obtained by splitting Table 9 in a form of Table 4. This is not described in this embodiment of the present invention. When modulation and coding schemes supported by the OFDM waveform are QPSK, 16QAM, 64QAM, and 256QAM, the preset correspondence between an MCS index and one of a modulation order, a transport block size, and a redundancy version may be shown in Table 10. The preset correspondence between an MCS index and a transport block size and the preset correspondence between an MCS index and a redundancy version may be obtained by splitting Table 10 in a form of Table 5. This is not described in this embodiment of the present invention.

TABLE 6

| MCS index $^{IMCS}$ | Modulation order $Q_m$ | Transport block size $^{ITBS}$ | Redundancy version $rv_{idx}$ |
|---|---|---|---|
| 0 | 1 | $T_0$ | $R_0$ |
| 1 | 1 | $T_1$ | $R_1$ |
| ... | ... | ... | ... |
| $N_1$ | 1 | $T_{N1}$ | $R_{N1}$ |
| $N_1 + 1$ | 2 | $T_{N1+1}$ | $R_{N1+1}$ |
| ... | ... | ... | ... |
| $N_2$ | 2 | $T_{N2}$ | $R_{N2}$ |
| $N_2 + 1$ | 4 | $T_{N2+1}$ | $R_{N2+1}$ |
| ... | ... | ... | ... |
| $N_3$ | 4 | $T_{N3}$ | $R_{N3}$ |
| $N_3 + 1$ | 6 | $T_{N3+1}$ | $R_{N3+1}$ |
| ... | ... | ... | ... |
| $N_4$ | 6 | $T_{N4}$ | $R_{N4}$ |
| $N_4 + 1$ | 8 | $T_{N4+1}$ | $R_{N4+1}$ |
| ... | ... | ... | ... |
| $N_5$ | 8 | $T_{N5}$ | $R_{N5}$ |

TABLE 7

| MCS index $^{IMCS}$ | Modulation order $Q_m$ | Transport block size $^{ITBS}$ | Redundancy version $rv_{idx}$ |
|---|---|---|---|
| 0 | 1 | $T_0$ | $R_0$ |
| 1 | 1 | $T_1$ | $R_1$ |
| ... | ... | ... | ... |
| $N_1$ | 1 | $T_{N1}$ | $R_{N1}$ |
| $N_1 + 1$ | 2 | $T_{N1+1}$ | $R_{N1+1}$ |
| ... | ... | ... | ... |
| $N_2$ | 2 | $T_{N2}$ | $R_{N2}$ |
| $N_2 + 1$ | 4 | $T_{N2+1}$ | $R_{N2+1}$ |
| ... | ... | ... | ... |
| $N_3$ | 4 | $T_{N3}$ | $R_{N3}$ |

TABLE 8

| MCS index $^{IMCS}$ | Modulation order $Q_m$ | Transport block size $^{ITBS}$ | Redundancy version $rv_{idx}$ |
|---|---|---|---|
| 0 | 1 | $T_0$ | $R_0$ |
| 1 | 1 | $T_1$ | $R_1$ |
| ... | ... | ... | ... |
| $N_1$ | 1 | $T_{N1}$ | $R_{N1}$ |
| $N_1 + 1$ | 2 | $T_{N1+1}$ | $R_{N1+1}$ |
| ... | ... | ... | ... |
| $N_2$ | 2 | $T_{N2}$ | $R_{N2}$ |
| $N_2 + 1$ | 4 | $T_{N2+1}$ | $R_{N2+1}$ |
| ... | ... | ... | ... |
| $N_3$ | 4 | $T_{N3}$ | $R_{N3}$ |
| $N_3 + 1$ | 6 | $T_{N3+1}$ | $R_{N3+1}$ |
| ... | ... | ... | ... |
| $N_4$ | 6 | $T_{N4}$ | $R_{N4}$ |

TABLE 9

| MCS index $^{IMCS}$ | Modulation order $Q_m$ | Transport block size $^{ITBS}$ | Redundancy version $rv_{idx}$ |
|---|---|---|---|
| 0 | 2 | $T_0$ | $R_0$ |
| 1 | 2 | $T_1$ | $R_1$ |
| ... | ... | ... | ... |
| $N_4$ | 2 | $T_{N4}$ | $R_{N4}$ |
| $N_4 + 1$ | 4 | $T_{N4+1}$ | $R_{N4+1}$ |
| ... | ... | ... | ... |
| $N_5$ | 4 | $T_{N5}$ | $R_{N5}$ |
| $N_5 + 1$ | 6 | $T_{N5+1}$ | $R_{N5+1}$ |
| ... | ... | ... | ... |
| $N_6$ | 6 | $T_{N6}$ | $R_{N6}$ |

TABLE 10

| MCS index $^{IMCS}$ | Modulation order $Q_m$ | Transport block size $^{ITBS}$ | Redundancy version $rv_{idx}$ |
|---|---|---|---|
| 0 | 2 | $T_0$ | $R_0$ |
| 1 | 2 | $T_1$ | $R_1$ |
| ... | ... | ... | ... |
| $N_5$ | 2 | $T_{N5}$ | $R_{N5}$ |
| $N_5 + 1$ | 4 | $T_{N5+1}$ | $R_{N5+1}$ |
| ... | ... | ... | ... |
| $N_6$ | 4 | $T_{N6}$ | $R_{N6}$ |
| $N_6 + 1$ | 6 | $T_{N6+1}$ | $R_{N6+1}$ |
| ... | ... | ... | ... |
| $N_7$ | 6 | $T_{N7}$ | $R_{N7}$ |
| $N_7 + 1$ | 8 | $T_{N7+1}$ | $R_{N7+1}$ |
| ... | ... | ... | ... |
| $N_8$ | 8 | $T_{N8}$ | $R_{N8}$ |

For ease of description, the following describes an information transmission process by using the preset correspondence between an MCS index and a modulation order and an example in which the DFT-s-OFDM waveform and the OFDM waveform share a same table. The network device may determine the MCS information of the terminal device based on the preset correspondence between an MCS index and a modulation order. The MCS information of the terminal device is used to indicate the modulation order used by the terminal device for data transmission, and the modulation order of the terminal device is determined based on the MCS information of the terminal device, the information about the waveform used by the terminal device, and the preset correspondence between an MCS index and a modulation order. Specifically, a process of determining the modulation order of the terminal device may be described in the following several manners.

(1) The modulation order of the terminal device may be determined based on the MCS information of the terminal device, MCS offset information, and the preset correspondence between an MCS index and a modulation order. The MCS offset information may be determined based on the information about the waveform used by the terminal device. The information about the waveform used by the terminal device may include the waveform used by the terminal device and a lowest modulation order supported by the waveform used by the terminal device.

For example, when the waveform used by the terminal device is the OFDM waveform and a lowest modulation order supported by the OFDM waveform is 2, it can be learned from Table 1 that a modulation and coding scheme corresponding to the lowest modulation order supported by the OFDM waveform starts from the MCS index $I'_{MCS}$ $N_1+1$, and therefore, MCS offset information $N_1+1$ can be obtained. If the modulation and coding scheme MCS information sent by the network device includes specified $I'_{MCS}$ $N_7$ that is used when the terminal device performs transmission, then it can be determined from Table 1 that the modulation order used by the terminal device for data transmission is a modulation order corresponding to an MCS index $N_7-(N+1)$.

For another example, when the waveform used by the terminal device is the DFT-s-OFDM waveform and a lowest modulation order supported by the DFT-s-OFDM waveform is 1, it can be learned from Table 1 that a modulation and coding scheme corresponding to the lowest modulation order supported by the DFT-s-OFDM waveform starts from the MCS index $I'_{MCS}$ 0, and therefore, MCS offset information 0 can be obtained. If the lowest modulation order supported by the DFT-s-OFDM waveform is 2, it can be learned from Table 1 that a modulation and coding scheme corresponding to the lowest modulation order supported by the DFT-s-OFDM waveform starts from the MCS index $I'_{MCS}$ $N_1+1$, and therefore, MCS offset information $N_1+1$ can be obtained.

Optionally, an MCS offset may be preset, or may be a value notified by the network device to the terminal device by using signaling. The value does not directly correspond to a modulation order, and may be any integer.

(2) The modulation order of the terminal device is determined based on the MCS information of the terminal device, a mapping relationship between the MCS information of the terminal device and an MCS index, and the preset correspondence between an MCS index and a modulation order. The mapping relationship between the MCS information of the terminal device and an MCS index is determined based on the information about the waveform used by the terminal device.

Optionally, when the DFT-s-OFDM waveform and the OFDM waveform use different tables, the modulation order of the terminal device may be determined based on the MCS information of the terminal device and a correspondence between an MCS index corresponding to the waveform used by the terminal device and a modulation order. The correspondence between an MCS index corresponding to the waveform used by the terminal device and a modulation order may be determined based on the information about the waveform used by the terminal device.

For example, when the waveform used by the terminal device is the OFDM waveform, a correspondence between an MCS index corresponding to the OFDM waveform and a modulation order may be directly determined. In this case, the MCS information of the terminal device may be determined based on the modulation order used by the terminal device for data transmission. In this case, the MCS information of the terminal device may be directly indicated in control information.

After the terminal device receives the MCS information sent by the network device, the MCS information sent by the network device is MCS information of the terminal device determined by the network device, and the terminal device may obtain, based on the MCS information sent by the network device, the information about the waveform used by the terminal device, the preset correspondence between an MCS index and a modulation order, the modulation order used by the terminal device for data transmission. The information about the waveform used by the terminal device may include the waveform used by the terminal device and a lowest modulation order supported by the waveform used by the terminal device. During determining of the modulation order used by the terminal device for data transmission, when the DFT-s-OFDM waveform and the OFDM waveform share a same table, the following implementations may be specifically described:

(1) The terminal device first determines the MCS offset information based on the information about the waveform used by the terminal device, and then determines, based on the MCS offset information, the MCS information sent by the network device, and the preset correspondence between an MCS index and a modulation order, the modulation order used by the terminal device for data transmission.

For example, when the waveform used by the terminal device for data channel transmission is the OFDM waveform, and a lowest modulation order supported by the OFDM waveform is 2, it can be learned from Table 1 that an MCS index starts from $N_1+1$ and therefore is offset by $N_1+1$ relative to 0, so that it can be determined that the MCS offset information is $N_1+1$. The MCS information sent by the network device received by the terminal device is $I_{MCS}$, and the terminal device may learn, through querying the correspondence between an MCS index and a modulation order in Table 1, that the modulation order used by the terminal device for data transmission is a modulation order corresponding to an MCS index $I_{MCS}=N_1+1$.

For another example, when the waveform used by the terminal device for data channel transmission is the DFT-s-OFDM waveform, and a lowest modulation order supported by the DFT-s-OFDM waveform is 1, it can be learned from Table 1 that an MCS index starts from 0, and therefore, the MCS offset information is 0. A modulation order corresponding to the MCS information $I_{MCS}$ sent by the network device may be directly determined as the modulation order used by the terminal device for data transmission.

If a lowest modulation order supported by the DFT-s-OFDM waveform is 2, it can be learned from Table 1 that an MCS index starts from $N_1+1$, and therefore is offset by $N_1+1$ relative to 0, so that it can be determined that the MCS offset information is $N_1+1$. The MCS information sent by the network device received by the terminal device is $I_{MCS}$, and the terminal device may learn, through querying the correspondence between an MCS index and a modulation order in Table 1, that the modulation order used by the terminal device for data transmission is a modulation order corresponding to an MCS index $I_{MCS}+N_1+1$.

(2) The terminal device first determines, based on the information about the waveform used by the terminal device, the mapping relationship between the MCS information sent by the network device and an MCS index, and then determines, based on the mapping relationship between the MCS information sent by the network device and an MCS index, the modulation order used by the terminal device for data transmission. The mapping relationship between the MCS information sent by the network device and an MCS index may be represented by a mathematical formula, or may be represented in another manner in which the mapping relationship can be clearly described. This is not limited in this embodiment of the present invention, but is merely an example.

For example, when the waveform used by the terminal device for data channel transmission is the OFDM waveform, it can be learned from Table 1 that an MCS index starts from $N_1+1$, and the terminal device may select some values from $N_1+1$ to $N_4$, for example, select only odd values or only even values from $N_1+1$ to $N_4$, and select all values from $N_4+1$ to $N_5$. In this case, the MCS information received by the terminal device from control information sent by the network device is $I_{MCS}$, and an MCS index $I'_{MCS}$ used by the terminal device in this data information transmission may be shown in Formula (1), Formula (2), or Formula (3):

$$I'_{MCS} = \begin{cases} 2 \cdot I_{MCS}, & \text{if } 2 \cdot I_{MCS} \leq N_4 \\ I_{MCS} + \Delta_2, & \text{if } 2 \cdot I_{MCS} > N_4 \end{cases} \quad (1)$$

$\Delta_2 = \lceil N_4/2 \rceil$, and $\lceil \ \rceil$ represents rounding up;

$$I'_{MCS} = \begin{cases} 2 \cdot I_{MCS} + 1, & \text{if } 2 \cdot I_{MCS} + 1 \leq N_4 \\ \Delta_3 + I_{MCS}, & \text{if } 2 \cdot I_{MCS} > N_4, \text{ and } N_4 \text{ is an odd number} \end{cases} \quad (2)$$

$\Delta_3 = \lceil N_4/2 \rceil$;

$$I'_{MCS} = \begin{cases} 2 \cdot I_{MCS} + 1, & \text{if } 2 \cdot I_{MCS} + 1 \leq N_4 \\ I_{MCS} + \Delta_4, & \text{if } 2 \cdot I_{MCS} > N_4, \text{ and } N_4 \text{ is an even number} \end{cases} \quad (3)$$

$\Delta_4 = N_4/2 + 1$.

After the MCS index is obtained, the modulation order used by the terminal device for data channel transmission may be directly obtained based on the correspondence between an MCS index and a modulation order, so that a corresponding modulation and coding scheme can be obtained.

Optionally, when the DFT-s-OFDM waveform and the OFDM waveform use different tables, the terminal device may first determine, based on the information about the waveform used by the terminal device, a correspondence between an MCS index corresponding to the waveform used by the terminal device and a modulation order, and then determine, based on the MCS information sent by the network device and the determined correspondence between an MCS index corresponding to the waveform used by the terminal device and a modulation order, the modulation order used by the terminal device for data transmission.

For example, when the waveform used by the terminal device is the DFT-s-OFDM waveform, a correspondence between an MCS index corresponding to the DFT-s-OFDM waveform and a modulation order may be determined. In this case, as long as the MCS information sent by the network device is known, the modulation order that corresponds to the MCS information and that is used by the terminal device for data transmission can be directly obtained through table lookup.

Optionally, when determining the modulation order used by the terminal device for data transmission, the terminal device may further consider information about an MCS supported by the terminal device. In this embodiment of the present invention, the information about the MCS supported by the terminal device may be a modulation order supported by the terminal device. Specifically, during determining of the modulation order used by the terminal device for data transmission, when the DFT-s-OFDM waveform and the OFDM waveform share a same table, the following implementations may be specifically described:

(1) The terminal device first determines the MCS offset information based on the information about the waveform used by the terminal device and the information about the MCS supported by the terminal device, and then determines, based on the MCS offset information, the MCS information sent by the network device, and the preset correspondence between an MCS index and a modulation order, the modulation order used by the terminal device for data transmission.

For example, if the waveform used by the terminal device for data channel transmission is the OFDM waveform, and modulation orders supported by the terminal device are 1, 2, and 4, MCS indexes supported by the terminal device range from 0 to $N_3$. In this case, it can be determined that an MCS offset is 0. Optionally, $N_3$ may not exceed $2^{k_1}-1$, where $k_1$ is an integer, and $k_1$ bits may be used to represent the MCS information of the terminal device. In this case, assuming the $k_1$-bit MCS information received by the terminal device from control information sent by the network device is $I_{MCS}$, an MCS index $I'_{MCS}$ used by the terminal device in this data channel transmission is $I'_{MCS}=I_{MCS}$. Correspondingly, a modulation order corresponding to the MCS index $I'_{MCS}$ used in this data channel transmission can be determined. Optionally, $k_1$ may be set to 5.

If the waveform used by the terminal device for data channel transmission is the OFDM waveform, and the modulation orders supported by the terminal device are 2, 4, and 6, MCS indexes supported by the terminal device range from $N_1+1$ to $N_4$, and in this case, an MCS offset $N_1+1$ may be obtained. Optionally, $N_4-N_1-1$ may be not greater than $2^{k_2}-1$, and in this case, $k_2$ bits may be used to represent the MCS of the terminal device. In this case, assuming a value of the $k_2$-bit MCS index received by the terminal device from the control information sent by the network device is $I_{MCS}$, an MCS index $I'_{MCS}$ used by the terminal device in this data channel transmission is $I'_{MCS}=I_{MCS}+\Delta_1$, where $\Delta_1$ is an MCS offset and is an integer, and in this example, $\Delta_1=N_1+1$. Particularly, $k_2$ may be set to 5.

(2) The terminal device first determines, based on the information about the waveform used by the terminal device, the mapping relationship between the MCS information sent by the network device and an MCS index, and then determines, based on the mapping relationship between the MCS information sent by the network device and an MCS index, the modulation order used by the terminal device for data transmission. The mapping relationship between the MCS information sent by the network device and an MCS index may be represented by a mathematical formula, or may be represented in another manner in which the mapping relationship can be clearly described. This is not limited in this embodiment of the present invention, but is merely an example.

For example, if the waveform used by the terminal device for data channel transmission is the OFDM waveform, and the modulation orders supported by the terminal device are 2, 4, 6, and 8, a range of MCS indexes supported by the terminal device is some values from $N_1+1$ to $N_4$ (for example, only odd values or even values are selected) and all values from $N_4+1$ to $N_5$. In particular, a quantity of all valid MCS values is not greater than $2^{k_4}$. In this case, $k_4$ bits may be used to represent the MCS. In this case, assuming a value of the $k_4$-bit MCS received by the UE from the control information sent by the base station is $I_{MCS}$, an MCS index $I'_{MCS}$ used by the UE in this downlink data channel transmission may be shown in Formula (1), Formula (2), or Formula (3):

$$I'_{MCS} = \begin{cases} 2 \cdot I_{MCS}, & \text{if } 2 \cdot I_{MCS} \leq N_4 \\ I_{MCS} + \Delta_2, & \text{if } 2 \cdot I_{MCS} > N_4 \end{cases} \quad (1)$$

$\Delta_2 = \lceil N_4/2 \rceil$, and $\lceil \ \rceil$ represents rounding up;

$$I'_{MCS} = \begin{cases} 2 \cdot I_{MCS} + 1, & \text{if } 2 \cdot I_{MCS} + 1 \leq N_4 \\ \Delta_3 + I_{MCS}, & \text{if } 2 \cdot I_{MCS} > N_4, \text{ and } N_4 \text{ is an odd number} \end{cases} \quad (2)$$

$$\Delta_3 = \lceil N_4/2 \rceil;$$

$$I'_{MCS} = \begin{cases} 2 \cdot I_{MCS} + 1, & \text{if } 2 \cdot I_{MCS} + 1 \leq N_4 \\ I_{MCS} + \Delta_4, & \text{if } 2 \cdot I_{MCS} > N_4, \text{ and } N_4 \text{ is an even number} \end{cases} \quad (3)$$

$$\Delta_4 = N_4/2 + 1.$$

After the MCS index is obtained, the modulation order used by the terminal device for data channel transmission may be directly obtained based on the correspondence between an MCS index and a modulation order, so that a corresponding modulation and coding scheme can be obtained.

Optionally, when the DFT-s-OFDM waveform and the OFDM waveform use different tables, the terminal device may first determine, based on the information about the waveform used by the terminal device, a correspondence between an MCS index corresponding to the waveform used by the terminal device and a modulation order, and then determine, based on the MCS information sent by the network device and the determined correspondence between an MCS index corresponding to the waveform used by the terminal device and a modulation order, the modulation order used by the terminal device for data transmission.

For example, as shown in Table 2 and Table 4, modulation and coding schemes supported by the DFT-s-OFDM waveform are BPSK, QPSK, and 16QAM, and modulation and coding schemes supported by the OFDM waveform are QPSK, 16QAM, and 64QAM. $N_1$, $N_2$, $N_3$, $N_4$, $N_5$, and $N_6$ are positive integers, $N_1 < N_2 < N_3$, and $N_4 < N_5 < N_6$. Optionally, $N_3$ is not greater than $2^{k_5} - 1$, and in this way, $k_5$ bits may be used to represent the MCS information for the DFT-s-OFDM waveform. Similarly, $N_6$ may be not greater than $2^{k_6} - 1$ either, and in this way, $k_6$ bits may be used to represent the MCS information for the OFDM waveforms. Optionally, $k_5$ may be equal to $k_6$, and during sending of scheduling signaling, MCS information may be represented by using a same field length and is independent of a waveform.

As also shown in Table 3 and Table 5, the modulation and coding schemes supported by the DFT-s-OFDM waveform are BPSK, QPSK, 16QAM, and 64QAM, and the modulation and coding schemes supported by the OFDM waveform are QPSK, 16QAM, 64QAM, and 256QAM. $N_1$, $N_2$, $N_3$, $N_4$, $N_5$, $N_6$, $N_7$, and $N_8$ are positive integers, and $N_1 < N_2 < N_3 < N_4$ and $N_5 < N_6 < N_7 < N_8$. Optionally, $N_4$ is not greater than $2^{k_7} - 1$, and in this way, $k_7$ bits may be used to represent the MCS information for the DFT-s-OFDM waveform. Similarly, $N_8$ may be not greater than $2^{k_8} - 1$ either, and in this way, $k_8$ bits may be used to represent the MCS information for the OFDM waveforms. Optionally, $k_7$ may be equal to $k_8$, and during sending of scheduling signaling, MCS information may be represented by using a same field length and is independent of a waveform.

This embodiment of the present invention indicates that for the terminal device, a range supported by the MCS of the terminal device is a subset of the tables based on a difference between waveforms used by the terminal device for data channel transmission and a difference between supported modulation orders. The terminal device determines, based on the MCS information sent by the network device, the waveform used for data channel transmission, and the supported modulation order, the MCS modulation order that should be used by the terminal device. Further, values of $N_1$, $N_2$, $N_3$, $N_4$, and $N_5$ are properly designed, and different subsets may be supported with a same quantity of bits as far as possible. In this way, control signaling formats may use a same payload to represent MCS information of terminal devices with capabilities supporting different waveforms and different modulation orders, simplifying the control signaling format.

It should be noted that, for a process in which a transport block size used by the terminal device for data transmission is obtained based on the foregoing preset correspondence between an MCS index and a transport block size, and a process in which a transport block size used by the terminal device for data transmission is obtained based on the foregoing preset correspondence between an MCS index and a redundancy version, refer to a process in which the modulation order used by the terminal device for data transmission is obtained based on the foregoing preset correspondence between an MCS index and a modulation order. This is not described in this embodiment of the present invention.

Figure 4:
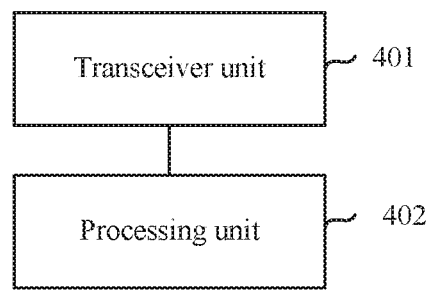
FIG. 4 is a schematic structural diagram of a signal transmission apparatus according to an embodiment of the present invention.

FIG. 4 shows a signal transmission apparatus according to this application. The signal transmission apparatus can perform a signal transmission process.

As shown in FIG. 4, the apparatus specifically includes a transceiver unit 401 and a processing unit 402.

The transceiver unit 401 is configured to receive MCS information sent by a network device.

The processing unit 402 is configured to determine, based on the MCS information sent by the network device, information about a waveform used by a terminal device, and a preset correspondence between an MCS index and a modulation order, a modulation order used by the terminal device for data transmission; and transmit data based on the determined modulation order.

Optionally, when determining the modulation order used by the terminal device for data transmission, the processing unit 402 is further configured to:

determine, based on the MCS information sent by the network device, the information about the waveform used by the terminal device, the preset correspondence between an MCS index and a modulation order, and information about an MCS supported by the terminal device, the modulation order used by the terminal device for data transmission.

Optionally, when determining the modulation order used by the terminal device for data transmission, the processing unit 402 is specifically configured to:

determine MCS offset information based on the information about the waveform used by the terminal device and the information about the MCS supported by the terminal device; and determine, based on the MCS offset information, the MCS information sent by the network device, and the preset correspondence between an MCS index and a modulation order, the modulation order used by the terminal device for data transmission.

Optionally, when determining the modulation order used by the terminal device for data transmission, the processing unit 402 is specifically configured to:

determine, based on the information about the waveform used by the terminal device and the information about the MCS supported by the terminal device, a mapping relationship between the MCS information sent by the network device and an MCS index; and determine, based on the determined mapping relationship between the MCS information sent by the network device and an MCS index, the MCS information sent by the network device, and the preset correspondence between an MCS index and a modulation order, the modulation order used by the terminal device for data transmission.

Optionally, when determining the modulation order used by the terminal device for data transmission, the processing unit 402 is specifically configured to:

determine, based on the information about the waveform used by the terminal device, a correspondence between an MCS index corresponding to the waveform used by the terminal device and a modulation order; and determine, based on the MCS information sent by the network device, the information about the MCS supported by the terminal device, and the determined correspondence between an MCS index corresponding to the waveform used by the terminal device and a modulation order, the modulation order used by the terminal device for data transmission.

Optionally, when determining the modulation order used by the terminal device for data transmission, the processing unit 402 is specifically configured to:

determining MCS offset information based on the information about the waveform used by the terminal device; and determine, based on the MCS offset information, the MCS information sent by the network device, and the preset correspondence between an MCS index and a modulation order, the modulation order used by the terminal device for data transmission.

Optionally, when determining the modulation order used by the terminal device for data transmission, the processing unit 402 is specifically configured to:

determine, based on the information about the waveform used by the terminal device, a mapping relationship between the MCS information sent by the network device and an MCS index; and determine, based on the determined mapping relationship between the MCS information sent by the network device and an MCS index, the MCS information sent by the network device, and the preset correspondence between an MCS index and a modulation order, the modulation order used by the terminal device for data transmission.

Optionally, when determining the modulation order used by the terminal device for data transmission, the processing unit 402 is specifically configured to:

determine, based on the information about the waveform used by the terminal device, a correspondence between an MCS index corresponding to the waveform used by the terminal device and a modulation order: and determine, based on the MCS information sent by the network device and the determined correspondence between an MCS index corresponding to the waveform used by the terminal device and a modulation order, the modulation order used by the terminal device for data transmission.

Figure 5:
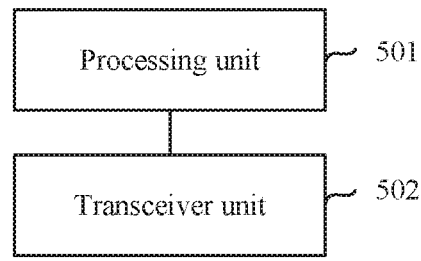
FIG. 5 is a schematic structural diagram of a signal transmission apparatus according to an embodiment of the present invention.

Based on the same technical concept, FIG. 5 shows a signal transmission apparatus according to this application, and the signal transmission apparatus can perform the signal transmission process.

As shown in FIG. 5, the apparatus specifically includes a processing unit 501 and a transceiver unit 502.

The processing unit 501 is configured to determine MCS information of a terminal device, where the MCS information is used to indicate a modulation order used by the terminal device for data transmission, and the modulation order of the terminal device is determined based on the MCS information of the terminal device, information about a waveform used by the terminal device, and a preset correspondence between an MCS index and a modulation order.

The transceiver unit 502 is configured to send the determined MCS information.

Optionally, the modulation order of the terminal device is determined based on the MCS information of the terminal device, MCS offset information, and the preset correspondence between an MCS index and a modulation order, and the MCS offset information is determined based on the information about the waveform used by the terminal device.

Optionally, the modulation order of the terminal device is determined based on the MCS information of the terminal device, a mapping relationship between the MCS information of the terminal device and an MCS index, and the preset correspondence between an MCS index and a modulation order, and the mapping relationship between the MCS information of the terminal device and an MCS index is determined based on the information about the waveform used by the terminal device.

Optionally, the modulation order of the terminal device is determined based on the MCS information of the terminal device, a correspondence between an MCS index corresponding to the waveform used by the terminal device and a modulation order, and the preset correspondence between an MCS index and a modulation order, and the correspondence between an MCS index corresponding to the waveform used by the terminal device and a modulation order is determined based on the information about the waveform used by the terminal device.

Figure 6:
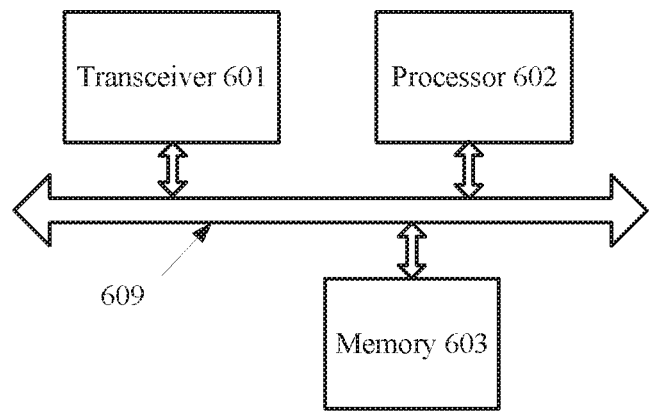
FIG. 6 is a schematic structural diagram of a signal transmission device according to an embodiment of the present invention.

Based on a same concept, FIG. 6 is a signal transmission device 600 according to an embodiment of the present invention. The signal transmission device 600 may perform the steps or functions performed by the terminal device in the embodiments described above. The signal transmission device 600 may include a transceiver 601, a processor 602, and a memory 603. The processor 602 is configured to control an operation of the signal transmission device 600. The memory 603 may include a read-only memory and a random access memory, and store an instruction that may be executed by the processor 602 and data. A part of the memory 603 may further include a non-volatile random access memory (NVRAM). Components such as the transceiver 601, the processor 602, and the memory 603 are connected by using a bus 609. In addition to a data bus, the bus 609 may further include a power bus, a control bus, and a status signal bus. However, for clear description, various types of buses in the figure are marked as the bus 609.

The signal transmission method that is disclosed in the embodiments of the present invention may be applied to the processor 602, or implemented by the processor 602. In an implementation process, the steps in the processing procedure may be completed by using an integrated logic circuit of hardware in the processor 602 or an instruction in a form of software. The processor 602 may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of the present invention. The universal processor may be a microprocessor or any conventional processor or the like. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 603. The processor 602 reads information stored in the memory 603, and completes the steps of the signal transmission method in combination with hardware of the processor 602.

The transceiver 601 is configured to receive MCS information sent by a network device. The processor 602 is configured to determine, based on the MCS information sent by the network device, information about a waveform used by a terminal device, and a preset correspondence between an MCS index and a modulation order, a modulation order used by the terminal device for data transmission, and transmit data based on the determined modulation order.

Optionally, when determining the modulation order used by the terminal device for data transmission, the processor 602 is further configured to:

determine, based on the MCS information sent by the network device, the information about the waveform used by the terminal device, the preset correspondence between an MCS index and a modulation order, and information about an MCS supported by the terminal device, the modulation order used by the terminal device for data transmission.

Optionally, when determining the modulation order used by the terminal device for data transmission, the processor 602 is specifically configured to:

determine MCS offset information based on the information about the waveform used by the terminal device and the information about the MCS supported by the terminal device; and determine, based on the MCS offset information, the MCS information sent by the network device, and the preset correspondence between an MCS index and a modulation order, the modulation order used by the terminal device for data transmission.

Optionally, when determining the modulation order used by the terminal device for data transmission, the processor 602 is specifically configured to:

determine, based on the information about the waveform used by the terminal device and the information about the MCS supported by the terminal device, a mapping relationship between the MCS information sent by the network device and an MCS index; and determine, based on the determined mapping relationship between the MCS information sent by the network device and an MCS index, the MCS information sent by the network device, and the preset correspondence between an MCS index and a modulation order, the modulation order used by the terminal device for data transmission.

Optionally, when determining the modulation order used by the terminal device for data transmission, the processor 602 is specifically configured to:

determine, based on the information about the waveform used by the terminal device, a correspondence between an MCS index corresponding to the waveform used by the terminal device and a modulation order; and determine, based on the MCS information sent by the network device, the information about the MCS supported by the terminal device, and the determined correspondence between an MCS index corresponding to the waveform used by the terminal device and a modulation order, the modulation order used by the terminal device for data transmission.

Optionally, when determining the modulation order used by the terminal device for data transmission, the processor 602 is specifically configured to:

determining MCS offset information based on the information about the waveform used by the terminal device; and determine, based on the MCS offset information, the MCS information sent by the network device, and the preset correspondence between an MCS index and a modulation order, the modulation order used by the terminal device for data transmission.

Optionally, when determining the modulation order used by the terminal device for data transmission, the processor 602 is specifically configured to:

determine, based on the information about the waveform used by the terminal device, a mapping relationship between the MCS information sent by the network device and an MCS index, and determine, based on the determined mapping relationship between the MCS information sent by the network device and an MCS index, the MCS information sent by the network device, and the preset correspondence between an MCS index and a modulation order, the modulation order used by the terminal device for data transmission.

Optionally, the processor 602 is configured to determine, based on the information about the waveform used by the terminal device, a correspondence between an MCS index corresponding to the waveform used by the terminal device and a modulation order; and determine, based on the MCS information sent by the network device and the determined correspondence between an MCS index corresponding to the waveform used by the terminal device and a modulation order, the modulation order used by the terminal device for data transmission.

Figure 7:
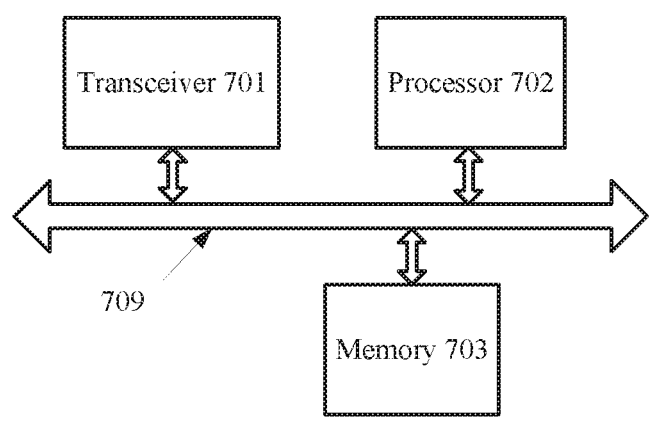
FIG. 7 is a schematic structural diagram of a signal transmission device according to an embodiment of the present invention.

Based on a same concept, FIG. 7 is a signal transmission device 700 according to an embodiment of the present invention. The signal transmission device 700 may perform the steps or functions performed by the network device in the embodiments described above. The signal transmission device 700 may include a transceiver 701, a processor 702, and a memory 703. The processor 702 is configured to control an operation of the signal transmission device 700. The memory 703 may include a read-only memory and a random access memory, and store an instruction that may be executed by the processor 702 and data. A part of the memory 703 may further include a non-volatile random access memory (NVRAM). Components such as the transceiver 701, the processor 702, and the memory 703 are connected by using a bus 709. In addition to a data bus, the bus 709 may further include a power bus, a control bus, and a status signal bus. However, for clear description, various types of buses in the figure are marked as the bus 709.

The signal transmission method that is disclosed in the embodiments of the present invention may be applied to the processor 702, or implemented by the processor 702. In an implementation process, the steps in the processing procedure may be completed by using an integrated logic circuit of hardware in the processor 702 or an instruction in a form of software. The processor 702 may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of the present invention. The universal processor may be a microprocessor or any conventional processor or the like. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 703. The processor 702 reads information stored in the memory 703, and completes the steps of the signal transmission method in combination with hardware of the processor 702.

The processor 702 is configured to determine MCS information of a terminal device, where the MCS information is used to indicate a modulation order used by the terminal device for data transmission, and the modulation order of the terminal device is determined based on the MCS information of the terminal device, information about a waveform used by the terminal device, and a preset correspondence between an MCS index and a modulation order.

The transceiver 701 is configured to send the determined MCS information.

Optionally, the modulation order of the terminal device is determined based on the MCS information of the terminal device, MCS offset information, and the preset correspondence between an MCS index and a modulation order, and the MCS offset information is determined based on the information about the waveform used by the terminal device.

Optionally, the modulation order of the terminal device is determined based on the MCS information of the terminal device, a mapping relationship between the MCS information of the terminal device and an MCS index, and the preset correspondence between an MCS index and a modulation order, and the mapping relationship between the MCS information of the terminal device and an MCS index is determined based on the information about the waveform used by the terminal device.

Optionally, the modulation order of the terminal device is determined based on the MCS information of the terminal device, a correspondence between an MCS index corresponding to the waveform used by the terminal device and a modulation order, and the preset correspondence between an MCS index and a modulation order, and the correspondence between an MCS index corresponding of the waveform used by the terminal device and a modulation order is determined based on the information about the waveform used by the terminal device.

Based on a same concept, a computer storage medium is provided, and is configured to store the computer software instructions executed by the processor shown in FIG. 6, to perform the steps implemented by the terminal device described above.

Based on a same concept, a computer storage medium is provided, and is configured to store the computer software instructions executed by the processor shown in FIG. 7, to perform the steps implemented by the terminal device described above.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of the present invention without departing from the scope of this application. This application is intended to cover these modifications and variations provided that they fall within the scope of protection defined by the following claims and their equivalent technologies.

The invention claimed is:

1. A signal transmission method, wherein the method comprises:
   receiving, by a terminal device, modulation and coding scheme (MCS} information sent by a network device;
   determining, by the terminal device, a modulation order used by the terminal device for data transmission, wherein the modulation order is determined based on the MCS information sent by the network device, information about a waveform used by the terminal device, and a preset correspondence between an MCS index and a modulation order; wherein the determining a modulation order used by the terminal device for data transmission comprises:
   determining, by the terminal device, MCS offset information based on the information about the waveform used by the terminal device; and
   determining, by the terminal device, the modulation order used by the terminal device for data transmission, wherein the modulation order is determined based on the MCS offset information, the MCS information sent by the network device, and the preset correspondence between an MCS index and a modulation order; and transmitting, by the terminal device, data based on the determined modulation order.

2. The method according to claim 1, wherein the determining a modulation order used by the terminal device for data transmission further comprises:
determining, by the terminal device, the modulation order used by the terminal device for data transmission, wherein the modulation order is determined based on the MCS information sent by the network device, the information about the waveform used by the terminal device, the preset correspondence between an MCS index and a modulation order, and information about an MCS supported by the terminal device.

3. The method according to claim 2, wherein the determining a modulation order used by the terminal device for data transmission comprises:
determining, by the terminal device, MCS offset information based on the information about the waveform used by the terminal device and the information about the MCS supported by the terminal device; and
determining, by the terminal device, the modulation order used by the terminal device for data transmission, wherein the modulation order is determined based on the MCS offset information, the MCS information sent by the network device, and the preset correspondence between an MCS index and a modulation order.

4. The method according to claim 2, wherein the determining a modulation order used by the terminal device for data transmission comprises:
determining, by the terminal device and based on the information about the waveform used by the terminal device and the information about the MCS supported by the terminal device, a mapping relationship between the MCS information sent by the network device and an MCS index; and
determining, by the terminal device, the modulation order used by the terminal device for data transmission, wherein the modulation order is determined based on the determined mapping relationship between the MCS information sent by the network device and an MCS index, the MCS information sent by the network device, and the preset correspondence between an MCS index and a modulation order.

5. The method according to claim 2, wherein the determining a modulation order used by the terminal device for data transmission comprises:
determining, by the terminal device and based on the information about the waveform used by the terminal device, a correspondence between an MCS index corresponding to the waveform used by the terminal device and a modulation order; and
determining, by the terminal device, the modulation order used by the terminal device for data transmission, wherein the modulation order is determined based on the MCS information sent by the network device, the information about the MCS supported by the terminal device, and the determined correspondence between an MCS index corresponding to the waveform used by the terminal device and a modulation order.

6. The method according to claim 1, wherein the determining a modulation order used by the terminal device for data transmission comprises:
determining, by the terminal device and based on the information about the waveform used by the terminal device, a mapping relationship between the MCS information sent by the network device and an MCS index; and
determining, by the terminal device, the modulation order used by the terminal device for data transmission, wherein the modulation order is determined based on the determined mapping relationship between the MCS information sent by the network device and an MCS index, the MCS information sent by the network device, and the preset correspondence between an MCS index and a modulation order.

7. The method according to claim 1, wherein the determining a modulation order used by the terminal device for data transmission comprises:
determining, by the terminal device and based on the information about the waveform used by the terminal device, a correspondence between an MCS index corresponding to the waveform used by the terminal device and a modulation order; and
determining, by the terminal device, the modulation order used by the terminal device for data transmission, wherein the modulation order is determined based on the MCS information sent by the network device and the determined correspondence between an MCS index corresponding to the waveform used by the terminal device and a modulation order.

8. A signal transmission method, wherein the method comprises:
determining, by a network device, modulation and coding scheme (MCS) information of a terminal device, wherein the MCS information is used to indicate a modulation order used by the terminal device for data transmission, and wherein the modulation order of the terminal device is determined based on the MCS information of the terminal device, information about a waveform used by the terminal device, and a preset correspondence between an MCS index and a modulation order, and
sending, by the network device, the determined MCS information, wherein the modulation order of the terminal device is determined based on the MCS information of the terminal device, MCS offset information, and the preset correspondence between an MCS index and a modulation order, and wherein the MCS offset information is determined based on the information about the waveform used by the terminal device.

9. The method according to claim 8, wherein the modulation order of the terminal device is determined based on the MCS information of the terminal device, a mapping relationship between the MCS information of the terminal device and an MCS index, and the preset correspondence between an MCS index and a modulation order, and wherein the mapping relationship between the MCS information of the terminal device and an MCS index is determined based on the information about the waveform used by the terminal device.

10. The method according to claim 8, wherein the modulation order of the terminal device is determined based on the MCS information of the terminal device, a correspondence between an MCS index corresponding to the waveform used by the terminal device and a modulation order, and the preset correspondence between an MCS index and a modulation order, and wherein the correspondence between an MCS index corresponding of the waveform used by the terminal device and a modulation order is determined based on the information about the waveform used by the terminal device.

11. A signal transmission apparatus, comprising:
- a transceiver, the transceiver configured to receive modulation and coding scheme (MCS) information sent by a network device; and
- at least one processor, the at least one processor configured to:
  - determine a modulation order used by the terminal device for data transmission, wherein the modulation order is determined based on the MCS information sent by the network device, information about a waveform used by a terminal device, and a preset correspondence between an MCS index and a modulation order; wherein when determining the modulation order used by the terminal device for data transmission, the at least one processor is configured to:
    - determine MCS offset information based on the information about the waveform used by the terminal device and the information about the MCS supported by the terminal device; and
    - determine the modulation order used by the terminal device for data transmission, wherein the modulation order is determined based on the MCS offset information, the MCS information sent by the network device, and the preset correspondence between an MCS index and a modulation order; and
  - transmit data based on the determined modulation order.

12. The apparatus according to claim 11, wherein when determining the modulation order used by the terminal device for data transmission, the at least one processor is further configured to:
- determine the modulation order used by the terminal device for data transmission, wherein the modulation order is determined based on the MCS information sent by the network device, the information about the waveform used by the terminal device, the preset correspondence between an MCS index and a modulation order, and information about an MCS supported by the terminal device.

13. The apparatus according to claim 12, wherein when determining the modulation order used by the terminal device for data transmission, the at least one processor is configured to:
- determine, based on the information about the waveform used by the terminal device and the information about the MCS supported by the terminal device, a mapping relationship between the MCS information sent by the network device and an MCS index; and
- determine the modulation order used by the terminal device for data transmission, wherein the modulation order is determined based on the determined mapping relationship between the MCS information sent by the network device and an MCS index, the MCS information sent by the network device, and the preset correspondence between an MCS index and a modulation order.

14. The apparatus according to claim 12, wherein when determining the modulation order used by the terminal device for data transmission, the at least one processor is configured to:
- determine, based on the information about the waveform used by the terminal device, a correspondence between an MCS index corresponding to the waveform used by the terminal device and a modulation order; and
- determine the modulation order used by the terminal device for data transmission, wherein the modulation order is determined based on the MCS information sent by the network device, the information about the MCS supported by the terminal device, and the determined correspondence between an MCS index corresponding to the waveform used by the terminal device and a modulation order.

15. The apparatus according to claim 11, wherein when determining the modulation order used by the terminal device for data transmission, the at least one processor is configured to:
- determining MCS offset information based on the information about the waveform used by the terminal device; and
- determine the modulation order used by the terminal device for data transmission, wherein the modulation order is determined based on the MCS offset information, the MCS information sent by the network device, and the preset correspondence between an MCS index and a modulation order.

16. The apparatus according to claim 11, wherein when determining the modulation order used by the terminal device for data transmission, the at least one processor is configured to:
- determine, based on the information about the waveform used by the terminal device, a mapping relationship between the MCS information sent by the network device and an MCS index; and
- determine the modulation order used by the terminal device for data transmission, wherein the modulation order is determined based on the determined mapping relationship between the MCS information sent by the network device and an MCS index, the MCS information sent by the network device, and the preset correspondence between an MCS index and a modulation order.

17. The apparatus according to claim 11, wherein when determining the modulation order used by the terminal device for data transmission, the at least one processor is configured to:
- determine, based on the information about the waveform used by the terminal device, a correspondence between an MCS index corresponding to the waveform used by the terminal device and a modulation order; and
- determine the modulation order used by the terminal device for data transmission, wherein the modulation order is determined based on the MCS information sent by the network device and the determined correspondence between an MCS index corresponding to the waveform used by the terminal device and a modulation order.

* * * * *

UNITED STATES PATENT AND TRADEMARK OFFICE
CERTIFICATE OF CORRECTION

PATENT NO. : 11,303,387 B2
APPLICATION NO. : 16/668934
DATED : April 12, 2022
INVENTOR(S) : Lei Chen and Fengwei Liu It is certified that error appears in the above-identified patent and that said Letters Patent is hereby corrected as shown below:

In the Claims

In Column 26 Line 49 In Claim 1, delete "(MCS}" and insert -- (MCS) --.

Signed and Sealed this
Eighteenth Day of October, 2022

Katherine Kelly Vidal
*Director of the United States Patent and Trademark Office*